Patented Dec. 28, 1937

2,103,686

UNITED STATES PATENT OFFICE 2,103,686

RUBBER COMPOSITION AND PRESERVATION OF RUBBER

George D. Martin, Nitro, W. Va., assignor, by mesne assignments, to Monsanto Chemical Company, Wilmington, Del., a corporation of Delaware No Drawing. Application June 2, 1934, Serial No. 728,753

23 Claims. (Cl. 18—50)

The present invention relates to the art of rubber manufacture, and particularly relates to the preparation of rubber compositions which resist deterioration due to ageing or to exposure to the atmosphere. It has long been known that such deterioration can be greatly retarded by treating the rubber either before or after vulcanization with certain substances known as age-resisters or antioxidants. One object of this invention is to provide a new and superior class of antioxidants for rubber. A further object of this invention is to provide a new and superior class of materials which when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual road service.

The age resisting characteristics of a vulcanized rubber product can be readily ascertained by subjecting samples of the vulcanized product in a bomb to the action of oxygen under elevated pressure and at an elevated temperature. The aged rubber samples are then examined and tested and the test data compared with the results obtained on testing the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural ageing of the rubber depending upon the condition of the test. In all the bomb tests hereinafter set forth, the ageing was carried out at temperatures of 70° C. and an oxygen pressure of 300 pounds per square inch.

The flex cracking resistance of the vulcanized rubber products was determined on a flexing machine as set forth by L. V. Cooper, Analytical Edition of Industrial and Engineering Chemistry, vol. 2, No. 4, 1930, pages 391–394.

According to the present invention, a new class of antioxidants or age-resisters has been found which, upon incorporating into a rubber stock, imparts exceptional age resisting and flex cracking resistance to the vulcanized rubber product. The compounds herein disclosed as imparting such desirable properties to vulcanized rubber comprise the reaction products of an amine, an aldehyde and an aliphatic alcohol, preferably prepared by reacting substantially equi-molecular proportions thereof.

For example, the following are typical members of the new and preferred class of materials which have been prepared and tested in the manner hereinbefore set forth: Reaction product of diphenylamine, formaldehyde and n-butyl alcohol; reaction product of phenyl beta naphthylamine, formaldehyde and n-butyl alcohol; reaction product of alpha naphthylamine, formaldehyde and n-butyl alcohol; reaction product of dicyclohexylamine, formaldehyde and n-butyl alcohol; reaction product of diphenylamine, butyraldehyde and n-butyl alcohol; reaction product of diphenylamine, formaldehyde and methyl alcohol; reaction product of diphenylamine, formaldehyde and ethyl alcohol; reaction product of diphenylamine, formaldehyde and tertiary butyl alcohol; reaction product of the butyraldehyde derivative of butylidene aniline (prepared substantially as described in U. S. Patent 1,897,210 granted to Clayton Olin North, February 14, 1933) further reacted with formaldehyde and n-butyl alcohol; reaction product of the formaldehyde derivative of the reaction product of three molecular proportions of acetaldehyde and two molecular proportions of aniline (prepared substantially as described in U. S. Patent 1,659,151 granted to Clayton Olin North, February 14, 1928), further reacted with formaldehyde and n-butyl alcohol; reaction product of diphenyl guanidine, formaldehyde and n-butyl alcohol; reaction product of diphenylamine, formaldehyde and propyl alcohol; reaction product of diphenylamine, formaldehyde and amyl alcohol; reaction product of hydrazobenzene, formaldehyde and n-butyl alcohol; reaction product of thiocarbanilide, formaldehyde and n-butyl alcohol; reaction product of formaldehyde, n-butyl alcohol and the condensation product of p-amino diphenyl and beta naphthol; reaction product of dinaphthylamine, formaldehyde and n-butyl alcohol; reaction product formed by reacting three molecular proportions of acetaldehyde and two molecular proportions of aniline (prepared substantially as indicated in U. S. Patent 1,659,152 granted to Clayton Olin North, February 14, 1928) and further reacting with formaldehyde and n-butyl alcohol; reaction product of diphenylamine, acetaldehyde and n-butyl alcohol; reaction product of para phenetidine, formaldehyde and n-butyl alcohol and reaction product of piperidine, formaldehyde and n-butyl alcohol.

In place of the aldehydes hereinbefore set forth I may employ propionic aldehyde, heptyl aldehyde, acrolein, crotonic and analogous aldehydes. In place of the aliphatic alcohols hereinbefore set forth I may employ iso and secondary butyl alcohols also the higher members of the aliphatic alcohols, as for example, heptyl alcohol, octyl alcohol, cetyl alcohol and analogous alcohols. In place of the amines hereinbefore set forth as employed in the preparation of the compounds tested, I may use dibutyl amine, diethyl amine, dimethyl amine, di-o-tolyl amine, di-iso-amyl amine, aniline, beta naphthylamine, cyclohexyl amine and their chemical equivalents.

Any one or a mixture of the above enumerated substances or of these substances with other antioxidants may be incorporated into rubber with good effect on its properties.

The following are to be understood as illustrative and not limitative of the scope of the present invention.

*Example I*

657 parts by weight of phenyl beta naphthylamine (three molecular proportions), 300 parts by weight of 40% formaldehyde solution (substantially a 33% excess over three molecular proportions) and 300 parts by weight of n-butyl alcohol (substantially a 35% excess over three molecular proportions) and 75 parts by weight of soda ash were placed in a suitable container and allowed to react preferably with agitation by heating on a water bath. It is thought the following reaction takes place as indicated by McLeod and Robinson, Journal of the Chemical Society, vol. 119 (1921), page 1471

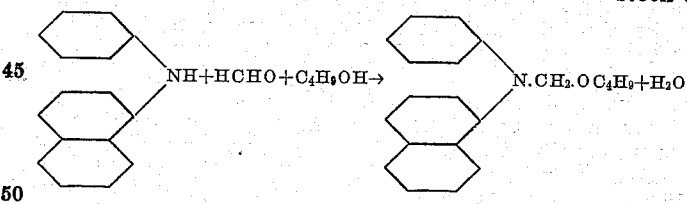

A brown oily layer formed, which was separated from the remainder of the reaction product, any unreacted materials were removed therefrom preferably by distilling at reduced pressure, and the residue comprising the preferred material, in nature a dark colored distillable oil, was incorporated in a typical rubber tread stock comprising

| | Parts |
|---|---|
| Smoked sheet rubber | 100 |
| Carbon black | 50 |
| Zinc oxide | 5 |
| Sulfur | 3 |
| Stearic acid | 3 |
| Pine tar | 2 |
| Benzothiazyl ester of thiobenzoic acid | 0.80 |
| Diphenyl guanidine | 0.20 |
| The reaction product of phenyl beta naphthylamine, formaldehyde and butyl alcohol | 1.0 |

The rubber stock so compounded was vulcanized in the well known manner and portions of the vulcanized product were then artificially aged by heating in the Bierer-Davis oxygen bomb for 96 hours at a temperature of 70° C. and an oxygen pressure of 300 pounds of oxygen per square inch. A comparison between the aged and unaged rubber product is given in Table I.

*Table I*

| Cure | | | Modulus of Elasticity in lbs/in² at elongations of | | Tensile at break in lbs/in² | Ult. elong. percent |
|---|---|---|---|---|---|---|
| Mins. | Lbs. steam pressure | Hrs. aged | 300% | 500% | | |
| 60 | 30 | 0 | 2150 | 4280 | 4600 | 530 |
| 60 | 30 | 96 | 1630 | -------- | 2590 | 475 |
| 75 | 30 | 0 | 2260 | 4380 | 4635 | 520 |
| 75 | 30 | 96 | 1695 | -------- | 2505 | 460 |
| 90 | 30 | 0 | 2285 | 4500 | 4500 | 500 |
| 90 | 30 | 96 | 1810 | -------- | 2365 | 410 |

Portions of the above-compounded and vulcanized rubber stock were also aged for 21 days in the Geer oven at 70° C., and the results obtained as given in Table II.

*Table II*

| Cure | | | Modulus of elasticity in lbs/in² at elongation of 300% | Tensile at break in lbs/in² | Ult. elong. percent |
|---|---|---|---|---|---|
| Mins. | Lbs. steam pressure | Days aged | | | |
| 60 | 30 | 21 | 2330 | 2985 | 400 |
| 75 | 30 | 21 | 2475 | 2850 | 345 |
| 90 | 30 | 21 | 2640 | 2640 | 300 |

The data set forth in Tables I and II show that the preferred class of materials, for example, the reaction product of phenyl beta naphthylamine, formaldehyde and butyl alcohol comprise an important class of antioxidants. Furthermore, on flexing the cured rubber product in the manner above described, it was found to be markedly superior in flex cracking resistance to a similar stock containing no antioxidant.

*Example II*

The reaction product of substantially equimolecular proportions of diphenylamine, formaldehyde and n-butyl alcohol was prepared in a manner analogous to that set forth in Example I. The liquid product so obtained was incorporated in a tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The reaction product of diphenylamine, formaldehyde and n-butyl alcohol | 1.0 |

The rubber stock thus compounded was vulcanized in the well known manner and portions of the vulcanized rubber product were then aged by heating in the Bierer-Davis oxygen bomb for 96 hours at a temperature of 70° C. and an oxygen pressure of 300 pounds per square inch. A comparison between the aged and unaged rubber products is given in Table III.

Table III

| Cure | | | Modulus of elasticity in lbs./in.² at elongations of | | Tensile at break in lbs./in.² | Ult. elong. percent |
|---|---|---|---|---|---|---|
| Mins. | Lbs. steam pressure | Hrs. aged | 300% | 500% | | |
| 75 | 30 | 0 | 2160 | 4200 | 4360 | 520 |
| 75 | 30 | 96 | 1890 | ------ | 2790 | 455 |
| 90 | 30 | 0 | 2295 | 4485 | 4485 | 500 |
| 90 | 30 | 96 | 2000 | ------ | 2720 | 400 |
| 105 | 30 | 0 | 2385 | 4505 | 4680 | 520 |
| 105 | 30 | 96 | 2045 | ------ | 2660 | 415 |

Flexing tests on the above unaged stocks and also on the above stocks aged for 3 days in the Geer oven at 70° C. showed them to possess desirable flexing properties.

Example III

A reaction product was prepared by allowing to react substantially one molecular proportion of n-butyl alcohol, one molecular proportion of 40% formaldehyde solution and substantially one-half a molecular proportion of alpha naphthylamine in a manner analogous to that used in preparing Example I. The reaction product comprising a reddish brown liquid was incorporated in a tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |
| The reaction product of alpha naphthylamine, formaldehyde and n-butyl alcohol | 1.0 |

The tensile and modulus properties of the aged and unaged vulcanized rubber product follow in Table IV.

Table IV

| Cure | | | Modulus of elasticity in lbs/in² at elongations of | | Tensile at break in lbs/in² | Ult. elong. percent |
|---|---|---|---|---|---|---|
| Mins. | Lbs. steam pressure | Hrs. aged | 300% | 500% | | |
| 75 | 30 | 0 | 2465 | 4510 | 4750 | 540 |
| 75 | 30 | 96 | 1890 | ------ | 2245 | 365 |
| 90 | 30 | 0 | 2260 | 4355 | 4355 | 490 |
| 90 | 30 | 96 | 1825 | ------ | 2020 | 355 |
| 105 | 30 | 0 | 2390 | 4485 | 4485 | 500 |
| 105 | 30 | 96 | 2015 | ------ | 2370 | 360 |

Flexing tests were also carried out on the above unaged stocks and on stocks aged for three days in the Geer oven at 70° C. and the rubber product found to possess desirable flexing properties.

As further examples showing specific embodiments of the invention, a base rubber stock was compounded comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl ester of thiobenzoic acid | 0.8 |
| Diphenyl guanidine | 0.2 |

In the above base stock 1 part of each of the following anti-oxidants, prepared in a manner analogous to that employed in Example I, was separately incorporated:

Reaction product of substantially equi-molecular proportions of diphenylamine, formaldehyde and methyl alcohol, designated as "Antioxidant A".

Reaction product of substantially equi-molecular proportions of diphenylamine, formaldehyde and ethyl alcohol, designated as "Antioxidant B".

Reaction product of substantially equi-molecular proportions of diphenylamine, formaldehyde and tertiary butyl alcohol, designated as "Antioxidant C".

Reaction product of substantially equi-molecular proportions of diphenylamine, butyraldehyde and n-butyl alcohol, designated as "Antioxidant D".

Reaction product of substantially equi-molecular proportions of diphenyl guanidine, formaldehyde and n-butyl alcohol, designated as "Antioxidant E".

Reaction product of substantially equi-molecular proportions of diphenylamine, formaldehyde and propyl alcohol, designated as "Antioxidant F".

Reaction product of substantially equi-molecular proportions of diphenylamine, formaldehyde and amyl alcohol, designated as "Antioxidant G".

Reaction product of substantially equi-molecular proportions of beta beta dinaphthylamine, formaldehyde and butyl alcohol, designated as "Antioxidant H".

Reaction product of substantially equi-molecular proportions of diphenylamine, acetaldehyde and n-butyl alcohol, designated as "Antioxidant I".

The rubber stocks so compounded were vulcanized by heating in a press for 90 minutes at the temperature of 30 pounds of steam pressure per square inch. Portions of the cured rubber stock were then artificially aged by heating in the Bierer-Davis oxygen bomb for 96 hours at a temperature of 70° C. and an oxygen pressure of 300 pounds per square inch. A comparison between the tensile and modulus properties of the unaged and aged cured rubber products follow in Table V.

Table V

| Anti-oxidant | Hrs. aged | Modulus of elasticity in lbs/in² at elongation of 300 percent | Tensile at break in lbs/in² | Ult. elong. percent |
|---|---|---|---|---|
| A | 0 | 2205 | 4330 | 510 |
| A | 96 | 1915 | 2565 | 410 |
| B | 0 | 2235 | 4435 | 505 |
| B | 96 | 1980 | 2665 | 410 |
| C | 0 | 2325 | 4520 | 515 |
| C | 96 | 1940 | 2575 | 410 |
| D | 0 | 2250 | 4535 | 500 |
| D | 96 | 2040 | 2650 | 405 |
| E | 0 | 2880 | 4495 | 470 |
| E | 96 | 1850 | 1985 | 320 |
| F | 0 | 2200 | 4630 | 520 |
| F | 96 | 1930 | 2715 | 420 |
| G | 0 | 2240 | 4540 | 520 |
| G | 96 | 1920 | 2055 | 420 |
| H | 0 | 2240 | 4405 | 500 |
| H | 96 | 1710 | 2110 | 385 |
| I | 0 | 2265 | 4640 | 515 |
| I | 96 | 1960 | 2600 | 405 |

From the data specifically set forth in Tables I, II, III, IV, and V, it is readily shown that the preferred class of compounds comprises an important class of rubber antioxidants which markedly resist the deterioration influences due to heat, oxidation and flexing.

Obviously, practice of the present invention is not limited to the specific compositions given above, such compositions being merely illustrative of the manner of employing the antioxidants or age-resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the one specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

What is claimed is:

1. The method of preserving rubber which comprises treating rubber with a reaction product obtainable by reacting substantially equi-molecular proportions of a secondary amine, an aliphatic aldehyde and an aliphatic alcohol in the presence of an inorganic alkaline catalyst.

2. The method of preserving rubber which comprises treating rubber with a reaction product obtainable by reacting substantially equi-molecular proportions of a diaryl amine, an aliphatic aldehyde and an aliphatic alcohol in the presence of an inorganic alkaline catalyst.

3. The method of preserving rubber which comprises treating rubber with a reaction product obtainable by reacting substantially equi-molecular proportions of a secondary aromatic amine, an aliphatic aldehyde and an aliphatic alcohol in the presence of an inorganic alkaline catalyst.

4. The method of preserving rubber which comprises treating rubber with a reaction product obtainable by reacting substantially equi-molecular proportions of a diarylamine, formaldehyde and an aliphatic alcohol in the presence of an inorganic alkaline catalyst.

5. The method of preserving rubber which comprises treating rubber with a reaction product obtainable by reacting substantially equi-molecular proportions of diphenylamine, formaldehyde and butyl alcohol in the presence of an inorganic alkaline catalyst.

6. The method of preserving rubber which comprises treating rubber with a reaction product obtainable by reacting substantially equi-molecular proportions of phenyl beta naphthylamine, formaldehyde and butyl alcohol in the presence of an inorganic alkaline catalyst.

7. The method of preserving rubber which comprises treating rubber with a reaction product obtainable by reacting substantially equi-molecular proportions of beta beta dinaphthyl amine, formaldehyde and butyl alcohol in the presence of an inorganic alkaline catalyst.

8. A composition comprising rubber and a reaction product obtainable by reacting substantially equi-molecular proportions of a secondary amine, an aliphatic aldehyde and an aliphatic alcohol in the presence of an inorganic alkaline catalyst.

9. A composition comprising rubber and a reaction product obtainable by reacting substantially equi-molecular proportions of a diaryl amine, an aliphatic aldehyde and an aliphatic alcohol in the presence of an inorganic alkaline catalyst.

10. A composition comprising rubber and a reaction product obtainable by reacting substantially equi-molecular proportions of a secondary aromatic amine, an aliphatic aldehyde and an aliphatic alcohol in the presence of an inorganic alkaline catalyst.

11. A composition comprising rubber and a reaction product obtainable by reacting substantially equi-molecular proportions of a diarylamine, formaldehyde and an aliphatic alcohol in the presence of an inorganic alkaline catalyst.

12. A composition comprising rubber and a reaction product obtainable by reacting substantially equi-molecular proportions of diphenylamine, formaldehyde and butyl alcohol in the presence of an inorganic alkaline catalyst.

13. A composition comprising rubber and a reaction product obtainable by reacting substantially equi-molecular proportions of phenyl beta naphthylamine, formaldehyde and butyl alcohol in the presence of an inorganic alkaline catalyst.

14. A composition comprising rubber and a reaction product obtainable by reacting substantially equi-molecular proportions of beta beta dinaphthylamine, formaldehyde and butyl alcohol in the presence of an inorganic alkaline catalyst.

15. A vulcanized rubber product possessing age resisting properties comprising the vulcanization product of a rubber stock containing prior to the vulcanization thereof a reaction product obtainable by reacting substantially equi-molecular proportions of a secondary amine, an aliphatic aldehyde and an aliphatic alcohol in the presence of an inorganic alkaline catalyst.

16. A vulcanized rubber product possessing age resisting properties comprising the vulcanization product of a rubber stock containing prior to the vulcanization thereof a reaction product obtainable by reacting substantially equi-molecular proportions of a diaryl amine, an aliphatic aldehyde and an aliphatic alcohol in the presence of an inorganic alkaline catalyst.

17. A vulcanized rubber product possessing age resisting properties comprising the vulcanization product of a rubber stock containing prior to the vulcanization thereof a reaction product obtainable by reacting substantially equi-molecular proportions of a secondary aromatic amine, an aliphatic aldehyde and an aliphatic alcohol in the presence of an inorganic alkaline catalyst.

18. A vulcanized rubber product possessing age resisting properties comprising the vulcanization product of a rubber stock containing prior to the vulcanization thereof a reaction product obtainable by reacting substantially equi-molecular proportions of diphenylamine, formaldehyde and butyl alcohol in the presence of an inorganic alkaline catalyst.

19. A vulcanized rubber product possessing age resisting properties comprising the vulcanization product of a rubber stock containing prior to the vulcanization thereof a reaction product obtainable by reacting substantially equi-molecular proportions of phenyl beta naphthylamine, formaldehyde and butyl alcohol in the presence of an inorganic alkaline catalyst.

20. A vulcanized rubber product possessing age resisting properties, comprising the vulcanization product of a rubber stock containing prior to the vulcanization thereof a reaction product obtainable by reacting substantially equi-molecular proportions of beta beta dinaphthylamine, formaldehyde and butyl alcohol in the presence of an inorganic alkaline catalyst.

21. The method of preserving rubber which comprises treating rubber with a product possessing the formula $$\begin{matrix} R^1 \\ R^2 \end{matrix} \!\!\! \diagdown\!\!\! N\!-\!R^3\!-\!OR^4$$

where $R^1$ and $R^2$ are alkyl or aryl radicals, $R^3$ is a methylene or alkylidene radical and $R^4$ is an alkyl radical.

22. A composition comprising rubber and a product possessing the formula $$\begin{matrix} R^1 \\ R^2 \end{matrix} \!\!\! \diagdown\!\!\! N\!-\!R^3\!-\!OR^4$$

where $R^1$ and $R^2$ are alkyl or aryl radicals, $R^3$ is a methylene or alkylidene radical and $R^4$ is an alkyl radical.

23. A vulcanized rubber product possessing age resisting properties comprising the vulcanization product of a rubber stock containing prior to the vulcanization thereof a product possessing the formula $$\begin{matrix} R^1 \\ R^2 \end{matrix} \!\!\! \diagdown\!\!\! N\!-\!R^3\!-\!OR^4$$

where $R^1$ and $R^2$ are alkyl or aryl radicals, $R^3$ is a methylene or alkylidene radical and $R^4$ is an alkyl radical.

GEORGE D. MARTIN.